(12) United States Patent
Vaissiere

(10) Patent No.: US 11,019,413 B2
(45) Date of Patent: May 25, 2021

(54) METHOD OF DETERMINING THE TIME INTERVAL UNTIL A SERVICE ACTION IS REQUIRED

(71) Applicant: Endress+Hauser Consult AG, Reinach (CH)

(72) Inventor: Dimitri Vaissiere, Rixheim (FR)

(73) Assignee: Endress+Hauser Group Services AG, Reinach (CH)

(*) Notice: Subject to any disclaimer, the term of this patent is extended or adjusted under 35 U.S.C. 154(b) by 0 days.

(21) Appl. No.: 16/718,747

(22) Filed: Dec. 18, 2019

(65) Prior Publication Data
US 2020/0204887 A1   Jun. 25, 2020

(30) Foreign Application Priority Data
Dec. 20, 2018  (EP) .................................... 18214501

(51) Int. Cl.
*H04Q 9/02* (2006.01)
*H04L 12/26* (2006.01)

(52) U.S. Cl.
CPC ........... *H04Q 9/02* (2013.01); *H04L 43/0858* (2013.01); *H04Q 2209/10* (2013.01); *H04Q 2209/86* (2013.01)

(58) Field of Classification Search
CPC ........ H04Q 9/00; H04Q 9/02; H04Q 2209/00; H04Q 2209/10; H04Q 2209/30;
(Continued)

(56) References Cited

U.S. PATENT DOCUMENTS

| | | | |
|---|---|---|---|
| 4,707,796 A | 11/1987 | Calabro et al. | |
| 10,359,771 B2* | 7/2019 | Trainor | G05B 23/0283 |

(Continued)

FOREIGN PATENT DOCUMENTS

| | | |
|---|---|---|
| EP | 1743226 A2 | 1/2007 |
| EP | 2602680 B1 | 6/2014 |
| EP | 2884358 A1 | 11/2014 |

OTHER PUBLICATIONS

Garcia, Mari Cruz, Sanz-Bobi, Miguel A., del Pico, Javier, Simap: Intelligent System for Predictive Maintenance Application to the health condition monitoring of a windturbine gearbox, Computers in Industry, Feb. 9, 2006, 17 pp.

*Primary Examiner* — Franklin D Balseca
(74) *Attorney, Agent, or Firm* — Mark A. Logan; Endress+Hauser (USA) Holding Inc.

(57) ABSTRACT

Disclosed is a method of determining the remaining time interval until a measurement characteristic of a field device will have drifted outside of a predetermined tolerance range and a service action is required. The method includes predetermining a maximum tolerance of the measurement characteristic correlated/related to the measuring performance of the field device; registering continuously the measurement characteristic of the field device; estimating a lag time interval wherein the estimated lag time interval depends on the drift of the measurement characteristic of the field device in the process specific application; using a method of Artificial Intelligence to determine, at the end of the estimated lag time interval, the remaining time interval until the measurement characteristic of a field device will have drifted outside the predetermined maximum tolerance; and generating a message informing of the remaining time interval until the service action is required.

14 Claims, 6 Drawing Sheets

(58) Field of Classification Search
CPC ........... H04Q 2209/40; H04Q 2209/84; H04Q 2209/86; H04L 43/0858
See application file for complete search history.

(56) References Cited

U.S. PATENT DOCUMENTS

| | | | |
|---|---|---|---|
| 10,539,930 B2 * | 1/2020 | Vaissiere | ................ G04F 13/00 |
| 2005/0182581 A1 | 8/2005 | Hashemian | |
| 2016/0270737 A1 * | 9/2016 | Steiger | ............... A61B 5/14532 |
| 2018/0136616 A1 * | 5/2018 | Takami | ................ G01D 18/008 |

* cited by examiner

METHOD OF DETERMINING THE TIME INTERVAL UNTIL A SERVICE ACTION IS REQUIRED

CROSS-REFERENCE TO RELATED APPLICATION

The present application is related to and claims the priority benefit of European Patent Application No. 18214501.1, filed on Dec. 20, 2018, the entire contents of which are incorporated herein by reference.

TECHNICAL FIELD

The present disclosure refers to a method of determining the remaining time interval until a measurement characteristic of a field device will have drifted outside of a predetermined maximum measurement tolerance and a service action is required, wherein the field device is measuring or monitoring at least one process variable of a medium in a process specific application of automation technology.

BACKGROUND

In automation technology, field devices are used for determining or monitoring process variables of a medium. Examples of such field devices are fill level measurement devices, mass flow measuring devices, pressure and temperature measuring devices, etc., which, as sensors, register the corresponding process variables fill level, flow, pressure, and temperature. Actuators, such as e.g. valves or pumps, are used for influencing process variables. They enable to vary the flow-rate of a liquid in a section of a pipeline or the fill level of a medium in a tank or container. Such field devices are manufactured and offered by the Endress+Hauser Group.

Field devices are connected to a super-ordinated unit, e.g. a control system, via a fieldbus system, as Profibus PA, Foundation Fieldbus, HART, etc., for example. The control system serves for managing process control, process visualization, process monitoring, and is used for setting the parameters of the field devices.

Often a maximum permissible error between a measurement data of the quantity or the measurement value representing the process variable and the corresponding measurement indications of the field device is based on an industry standard or another reference. In the case that the maximum permissible error is exceeded, the field device is considered not to be conform with the standard or the reference. Therefore, adjustment, repair, or replacement of the measurement device is required. Required adjustments are usually performed based on the data obtained during a calibration procedure. They include, for example, adjustments of offset, gain and/or span of the measurement indication.

If the measurement error does not exceed the maximum permissible error, conformity of the field device is declared and usually no further actions must be taken. To ensure that the field device fulfills the specified measurement characteristic, for example the specified measurement accuracy, and/or comply to a standard, there is provided maintenance on a regular basis.

Endress+Hauser Group is offering many field devices having a Heartbeat function. Such field devices use appropriate sensor and/or process specific measurement characteristics which provide information on the health status of each single field device.

Faultless functioning of the field devices, installed in an automation system ensures smooth and sure processes. Interruptions/disruptions of a running process due to malfunctioning of individual field devices can cause significant costs. Additionally, the number of alarms should be minimized. An alarm should only be set if it is unavoidable in a critical state.

To guarantee the faultless functioning of field devices, the field devices are checked at fixed service intervals. During regular service checkups, which are usually done by a service technician, wear parts are replaced and, especially, fault-prone components are checked more carefully. Recalibration of a device is required, e.g. when important components of a field device are repaired or replaced. Recalibration is also necessary, when field devices are physically damaged, or their calibration seal has been injured. Also, the optical impression of a field device can be a reason to make a recalibration.

Field devices are used in different applications and under different process conditions. Stable process conditions are given e.g. in the case that a homogeneous liquid is in a tank at constant temperature. In the case of abrasive or corrosive liquids, or when accretion formation is possible, then the process conditions are more critical.

Stable environmental conditions are, for example: Low humidity, no water spray, normal temperature, no dust and/or no vibrations. In such a case, the service intervals may be quite long. Critical environmental conditions may be, if the field device is used outside a building and/or subjected to extreme environmental conditions, for example high and low temperature changes, high humidity and/or strong vibrations. Such field devices need shorter service intervals.

The optimum length of a service interval depends on a multiplicity of factors.

Normally, service intervals of field devices are recommended by the manufacturer. In such case, application specific factors are only insufficiently taken into consideration. Some field devices serve only for the visualization of a process variable (e.g. pressure sensors). The failure of such a field device may be of lesser importance to a production process, as compared with the failure of a flow meter in a bottling plant, which may cause a shutdown of the entire production line.

Since service actions cause costs, short-interval service actions should be avoided whenever possible. On the other hand, the failure of a field device can cause an uncontrolled production stop, and this may be quite cost-intensive. For the plant operator, it is therefore of great importance that the service intervals for the field devices are individually determined, i.e. in dependence on the actual environmental and/or process conditions. Additionally, a false alarm should only be set in a critical state of a field device.

In WO 2011/109133 A1 a method is described for determining an optimized service interval between consecutive maintenance services of a field device, which is adapted to the conditions prevailing at the operation site of the field device. According to this method, the time interval between consecutive service actions is determined based on service information, for example, application-specific parameters prevailing at an operating site of the field device, device-specific parameters, as well as historical data and calibration data from previous calibrations of the field device.

Thus, service intervals of devices operating in a rough environment, which is e.g. subjected to extreme temperatures, temperature variations, pressures, and/or pressure variations, or exposed to abrasive and/or chemically aggressive products will be much shorter, than service intervals for devices operating under more friendly conditions. Unfortunately, it is generally not safe to apply always the same method to optimize calibration time intervals. The main reason for this is, that it is usually not possible to predict, when or on which timescale an initially fully compliant device will develop a relevant measurement error.

SUMMARY

An object of the present disclosure is to provide a reliable method of determining individual service intervals for field devices.

The service action itself can be, for example, a recalibration of the field device, a cleaning of the sensitive parts of the field device, a replacement of the field device or an exchange of a defect component of the field device.

The problem is solved by a method of determining the remaining time interval until the measurement characteristic of a field device will have drifted outside of a predetermined maximum tolerance and a service action is required, wherein the field device is measuring or monitoring at least one process variable of a medium in a process specific application of automation technology, comprising the steps of:

Predetermining the maximum tolerance of the measurement characteristic, wherein the measuring performance of the field device in the process specific application is unacceptable if the measurement characteristic is outside the predetermined maximum tolerance;

Registering continuously the measurement characteristic of the field device;

Estimating a lag time interval, wherein the estimated lag time interval depends on the drift of the measurement characteristic of the field device in the process specific application;

Using a method of artificial intelligence to determine, at the end of the estimated lag time interval, the remaining time interval until the measurement characteristic of a field device will have drifted outside the predetermined maximum tolerance;

Generating a message informing of the remaining time interval until the service action is required.

The maximum tolerance of the measurement characteristic corresponds to the maximum permissible drift of the field device in the corresponding application, usually caused by the drift of the measurement characteristic because of, for example, harsh environmental conditions or a creeping misfunctioning of the field device. There may be also other process specific or field device specific influences which are relevant to the maximum tolerance setting.

The measurement characteristic may be, for example, the measurement error. As already described before, a drifting, in particular an increasing measurement error is in so far critical as a demanded measurement accuracy of the field device in the process cannot achieved anymore as soon as a predetermined maximum permissible error tolerance is reached or exceed. The measurement error can be decided by comparing the measurement data of a field device with at least one redundant field device monitoring the same process variable, for example the temperature, with probably a higher precision. There is also a self-calibrating temperature sensor (TRUSTSENS) of the Endress+Hauser Group on the market, which is automatically recalibrated if the temperature of the process reaches a certain value. The calibration data provide information about the drift of the measurement. In principle, the measurement characteristic of a field device can be any quantity which can give information about a drift in the measurement performance of a field device. The measurement characteristic may be the amplitude of a radar signal which is determined at a given height of the medium in a container, or it may be a resistance, providing information on the health of the field device.

A refinement of the inventive method comprises the step of:

Estimating the lag time interval based on preferably a continuously registered measurement characteristic of the field device during a given time interval. Alternatively, the lag time interval of the field device in the process specific application can be estimated based on the expertise of a service technician or the plant operator, for example. There may be applications where a field device has a lag time of 2 days, wherein the same field device may have a lag time of half a year in another process environment.

The lag time interval is determined based on continuously sampled data related or correlated to the measurement characteristic of the field device during a certain time interval in the past. Based on this information a mathematical prediction method is used to predict the remaining time interval until the measurement characteristic will reach maximum permissible tolerance. Preferably, Monte Carlo Simulation is used to make a prediction in view of the remaining time interval until "failure". Some detailed information about the Monte Carlo Simulation is disclosed in EP 2 602 680 B1. In general, but restricted to our case, Monte Carlo Simulation is using statistical methods to predict the expected growth (or decay) over time of the measurement characteristic of a special field device in a special application. This prediction is based on the behavior of the measurement characteristic of the field device during a certain time interval in the past. This time interval is called lag time interval.

The reliability of the prediction of the remaining time interval is more precise as more periodically collected samples of the measurement characteristic are available. Additionally, it is important to know the variance of the data. If the variance, i.e. the error variance $\sigma^2/n$ grows, it is necessary to have larger numbers n of samples, i.e. data representing the measurement characteristic, to reach the same degree of confidence in the predicted remaining time interval, as if the variance is quite low. But there are also variance reduction methods known form the prior art. Although Monte Carlo Simulation is the preferred method to determine/predict the remaining time interval until the next service action, it is also possible to use, for example, a neural network, SARIMA or any other method known by Artificial Intelligence, for example Deep Learning, to make the prediction.

A further refinement of the method comprises the step of:

Generating a status message indicating that the measurement performance of the field device is okay, if it is excluded that the measurement characteristic of the field device, because of a drift, will reach the tolerance in a subsequent time interval, wherein the time interval is preferably in the size of several times $k_1$ the lag time interval, where $k_1>=1$;

Generating a warning status message indicating that the measurement performance of the field device is decreasing, if the measurement characteristic of the field device, because of a drift, will reach the maximum tolerance within a portion $k_2$ of the subsequent time interval in the size of $k_2$ times the lag time, where $0<k_2<k_1$ and in one of the subsequent time intervals in the size of $k_1$ times the lag time interval;

Generating a critical status message indicating that the field device is close to the maximum tolerance, if the measurement characteristic of the field device, because of a drift, will reach the maximum tolerance within a portion of the subsequent time interval in the size smaller than $k_2$ times the lag time interval. Only in the case that a critical status message is generated, the operator must act immediately—at least if the field device fulfills an essential function in this special application.

A further refinement of the inventive method and/or one or more of its before described refinements comprise/comprises the step:

Generating a message of failure if the measurement characteristic of the field device has reached or exceeded the tolerance at the end of the lag time interval. This message will usually set an alarm—at least if the field device fulfills an essential function in its application.

According to a preferred embodiment of the present disclosure a confidence level of the status messages of the field device is generated, wherein the confidence level provides information about the reliability of the determined remaining time interval. The confidence level is usually an additional result of the statistical prediction method, used to determine/predict the remaining time until the next service action will be necessary.

A further embodiment of the inventive method and its before described refinements comprise the step of using a nonlinear transformation of the predicted remaining time to failure relative to the lag time interval to determine the confidence level. Time to failure means in connection with the present disclosure, the time interval until the next service action should or must take place. In particular, the confidence level is provided as a percentage. A percentage close to 0% indicates a low confidence level, and a percentage close to 100% indicates a high confidence level.

A nonlinear transformation increases or decreases the linear relationship between variables. Examples of nonlinear transformations f(t) of a variable t are the square root t or the reciprocal of t. Preferably the lowest confidence level regarding the predicted remaining time interval is about 15%, and the highest confidence level is about 95%. It is obvious, that also other values are acceptable in connection with the confidence level.

In summary—including also the refinements—the present disclosure provides all the information which an operator needs to do something or to leave as it is. The remaining time interval is predicted, corresponding status information is provided as well as the confidence level of the prediction of the remaining time interval. Getting all this information also an unexperienced operator can initiate immediately necessary actions. Preferably, the information is also directly provided to outside service people, for example via Internet. Having all the information available, it is quite uncomplicated to take measures to remedy a problem in the process system early before a serious problem occurs.

In summary, the present disclosure refers to an time interval prediction based method of determining when and with which confidence a service action is required to ensure a desired reliability.

BRIEF DESCRIPTION OF THE DRAWINGS

The present disclosure and refinements of the present disclosure will now be explained in greater detail by the following figures.

DETAILED DESCRIPTION

Figure 1:
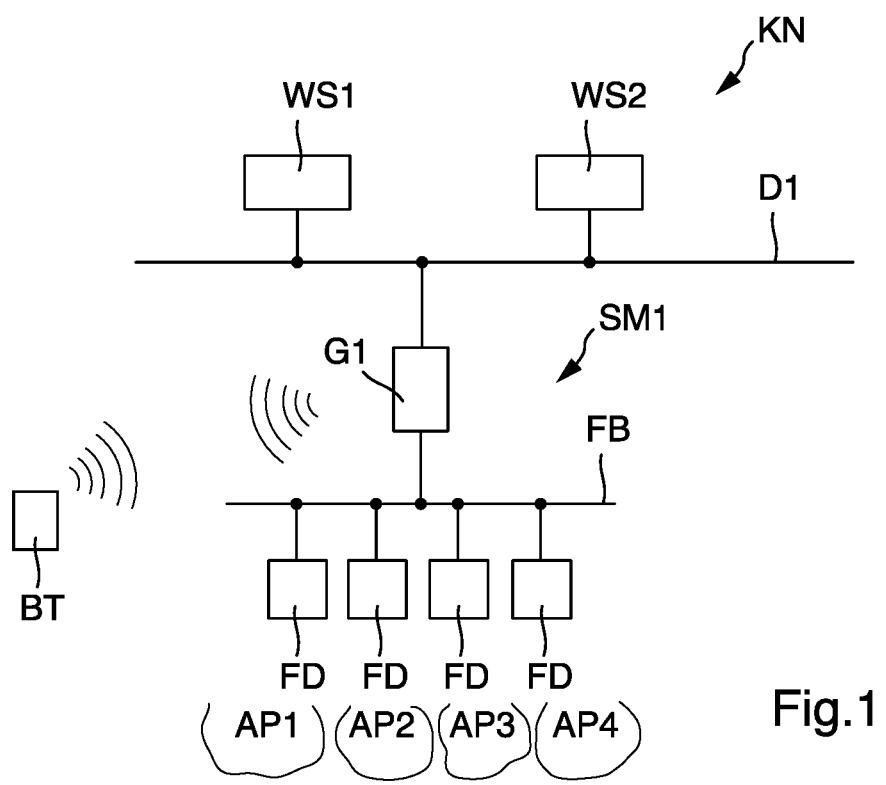
FIG. 1 shows a schematic view of a communication network of an automation system.

FIG. 1 shows a schematic view of a communication network KN of an automation system including the most important components. Connected to a databus D1 are some computer units (workstations) WS1, WS2. Also, a portable service unit BT may be used, for example, a mobile phone, a PAD, or a Laptop, to visualize measurement data or to service the field devices FD.

Each of the computer units may serve as super-ordinated control unit for process visualization, process monitoring and for engineering, as well as for interacting with and monitoring field devices FD. Databus D1 works, for example, according to the Profibus DP standard or the HSE (High Speed Ethernet standard) of Foundation Fieldbus. Via a gateway G1 which acts as a linking device or segment coupler, databus D1 is connected to a fieldbus segment SM1. Fieldbus segment SM1 is composed of a plurality of field devices FD which are connected to a fieldbus FB. The field devices FD may include both sensors and actuators. The Fieldbus FB works according to one of the known fieldbus standards, Profibus, Foundation Fieldbus or HART. Wireless Communication is also possible. It is clear, that the present disclosure also relates to stand-alone field devices which communicate with a control unit via 4-20 mA, usually in combination with HART communication.

The inventive method determines/predicts the remaining time interval RTI until the measurement characteristic of a field device FD will have drifted outside of a predetermined maximum tolerance T and a service action is required. The field device FD is measuring or monitoring at least one process variable of a medium in a process specific application of automation technology. Usually, a field device FD installed in a process of automation technology must be serviced if the specified measuring accuracy of the field device FD can no longer be guaranteed. As already described before, the drift of the measurement characteristic of a field device FD can be slow or fast because of harsh environmental conditions or a creeping defect of a field device component, for example. According to the present disclosure the remaining time interval until the next service action is necessary, is predicted based on the behavior of the measurement characteristic of the field device FD in the past, especially during a predetermined lag time interval LTI. The lag time interval LTI is based on continuously registered data related or correlated to the measurement characteristic of the field device FD during a given time interval in the past. Alternatively, the lag time interval LTI of the field device may be determined based on expertise. This may be the case, for example, in special critical process specific applications.

In a next step the maximum tolerance of the measurement characteristic is predetermined, wherein the measuring performance of the field device FD in the process specific application is unacceptable if the measurement characteristic reaches or is outside the predetermined maximum tolerance. Next, the measurement characteristic of the field device is continuously registered. The lag time interval LTI is determined, wherein the estimated lag time interval LTI depends on the drift of the measurement characteristic of the field device FD during its previous operation in the process specific application.

Using a method of artificial intelligence to determine, at the end of the estimated lag time interval LTI the remaining time interval RTI until the measurement characteristic of a field device FD will have drifted outside the predetermined maximum tolerance T;

Generating a message informing of the remaining time interval RTI until the service action is required.

Furthermore, the proposes as a refinement that the operator is getting information about the reliability of the predicted remaining time interval RTI until the field device FD must be serviced. There are different status messages provided. These status messages are based on different drifting behavior of the measurement characteristic. Examples are shown in figures FIG. 2 to FIG. 5. In the figures there is always shown a positive drift. Of course, also a negative drift is possible.

Figure 2:
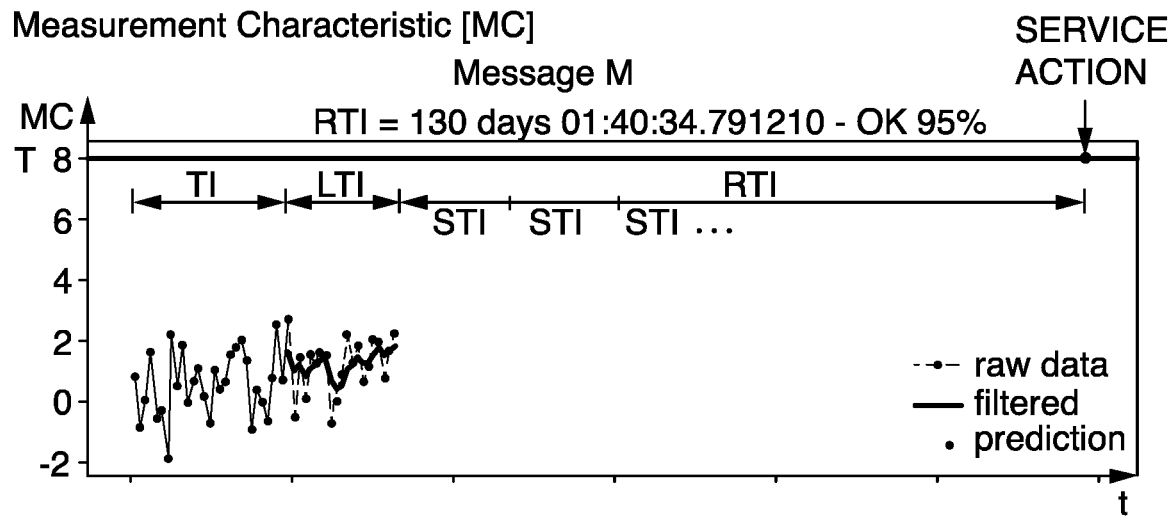
FIG. 2 shows a diagram of measurement characteristic over time of a field device being in an Okay state.

FIG. 2 shows a diagram of a measurement characteristic over time of a field device FD being in an okay state. It is predicted that the remaining time interval RTI is 130 days. Assuming a factor $k_1=2$ and a lag time of 20 days, the predicted remaining time RTI is beyond the subsequent time interval of 2×20 days=40 days. This leads to an Okay State and a confidence level CL of 95% for this prediction. The operator can safely let the field device FD run and wait until a measurement drift is confirmed in the future.

Figure 3:
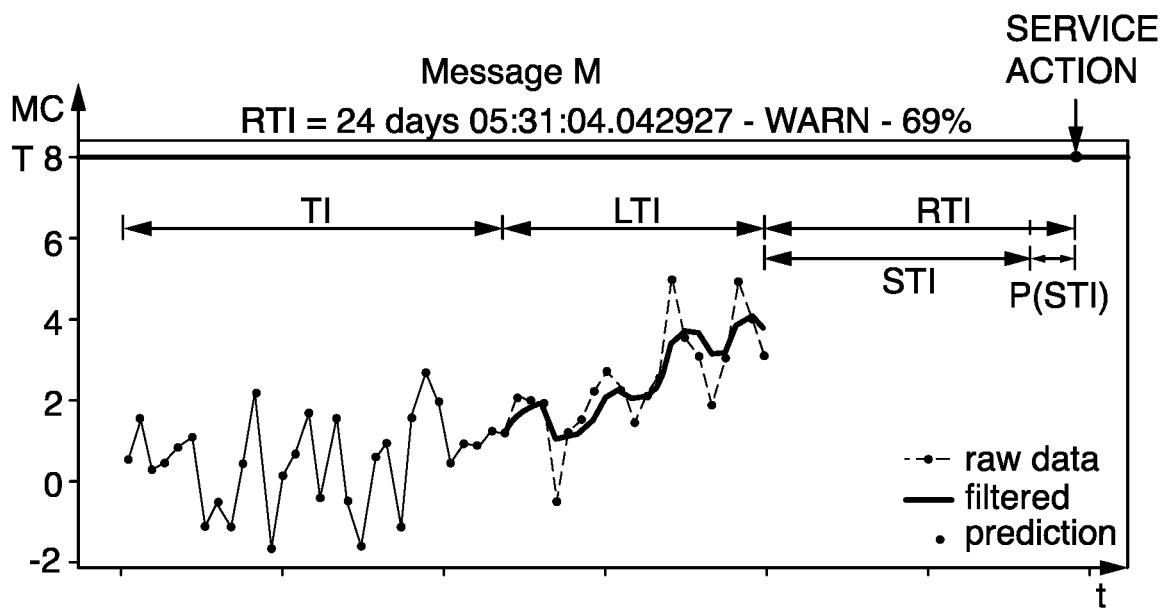
FIG. 3 shows a diagram of measurement characteristic over time of a field device being in a warning state.

FIG. 3 shows a diagram of a measurement characteristic over time of a field device FD being in a warning state. It is predicted that the remaining time RTI interval is 24 days. Assuming the following set of factors $k_1=2$; $k_2=0.1$ and a lag time interval of 20 days, the predicted remaining time RTI is below the subsequent time interval of 2×20 days=40 days and beyond a portion of the subsequent time interval of 0.1×20 days=2 days. This constellation leads to a warning state with a calculated confidence level CL of 69%. Depending on the function the field device FD fulfills in the process, the operator can decide if the predicted remaining time interval RTI will be exhausted, or if a service action is initiated earlier.

Figure 4:
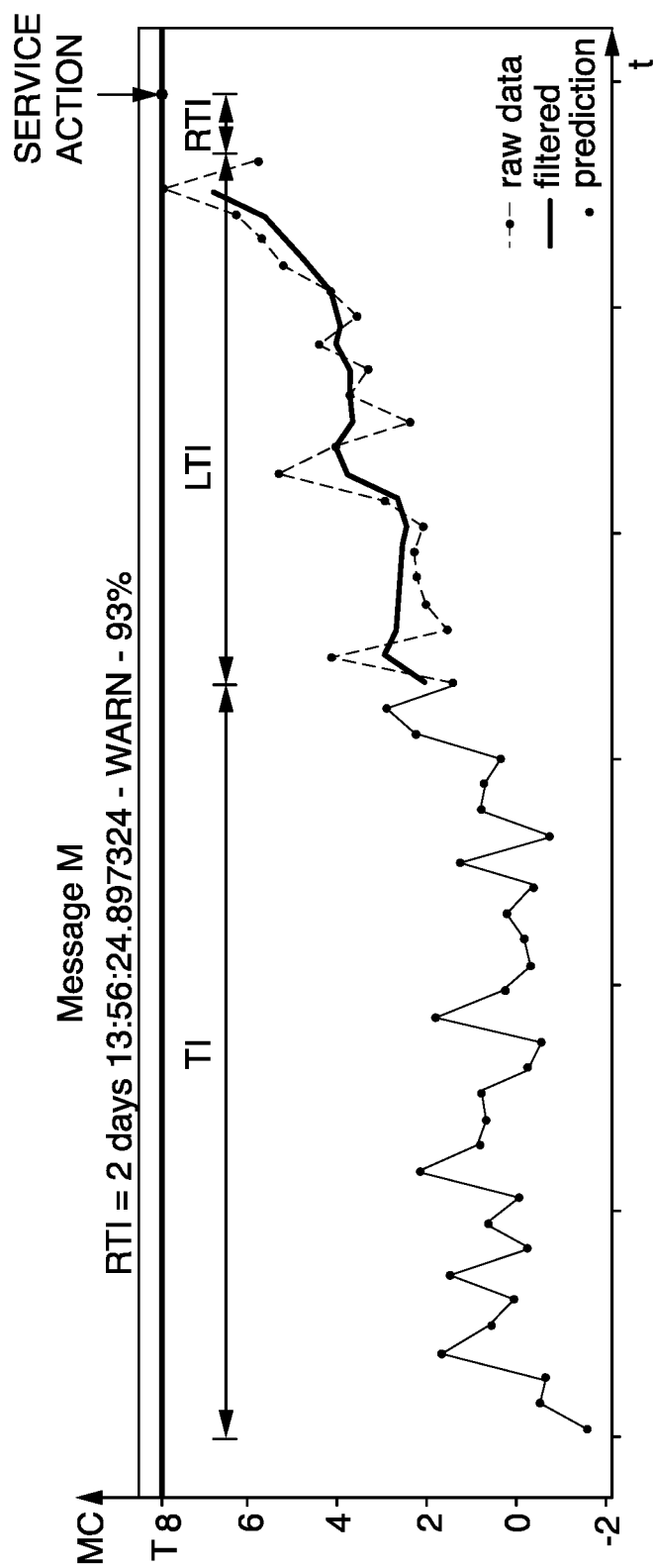
FIG. 4 shows a diagram of measurement characteristic over time of a field device being in a warning state.

FIG. 4 shows a diagram of a measurement characteristic over time of a field device being in a warning state. In this case a remaining time interval RTI of 2 days and 14 hours is predicted until the next service action must be done. Assuming the same settings as before, the field device FD still appears in a warning state, but there is now calculated a confidence level of 93%. This is a clear instruction to the operator to take immediately appropriate service measures.

Figure 5:
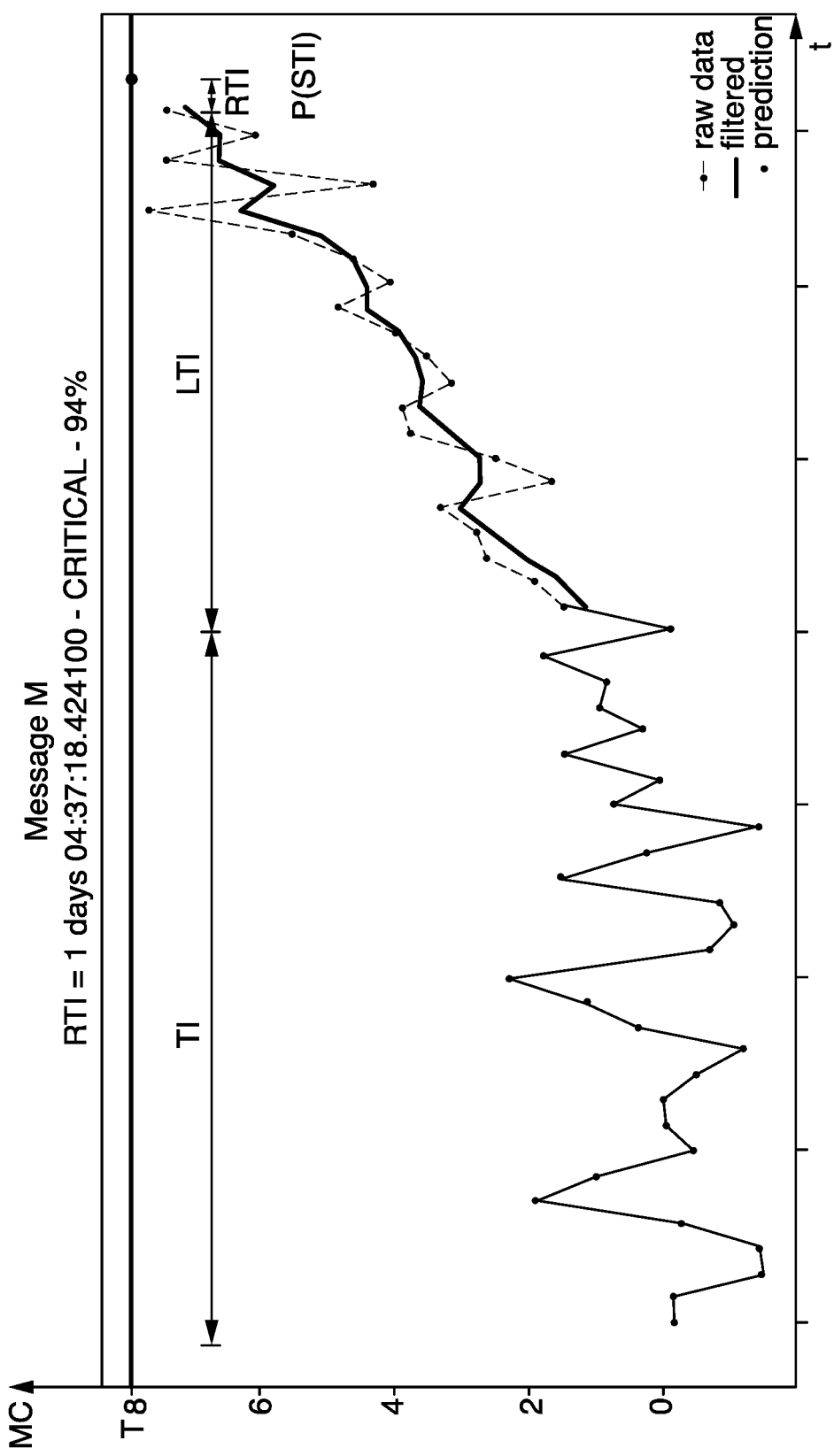
FIG. 5 shows a diagram of measurement characteristic over time of a field device being in a critical state.

FIG. 5 shows a diagram of a measurement characteristic over time of a field device FD which is in a critical state. Assuming still the same settings, the field device appears in a critical state as the remaining time interval RTI is 1 day and four hours an therefore less than a portion of the subsequent time interval defined as 0.1×20 days=2 days. The confidence CL is high—about 94%. A service action must be initiated immediately. In such a critical situation an alarm is set.

Figure 6:
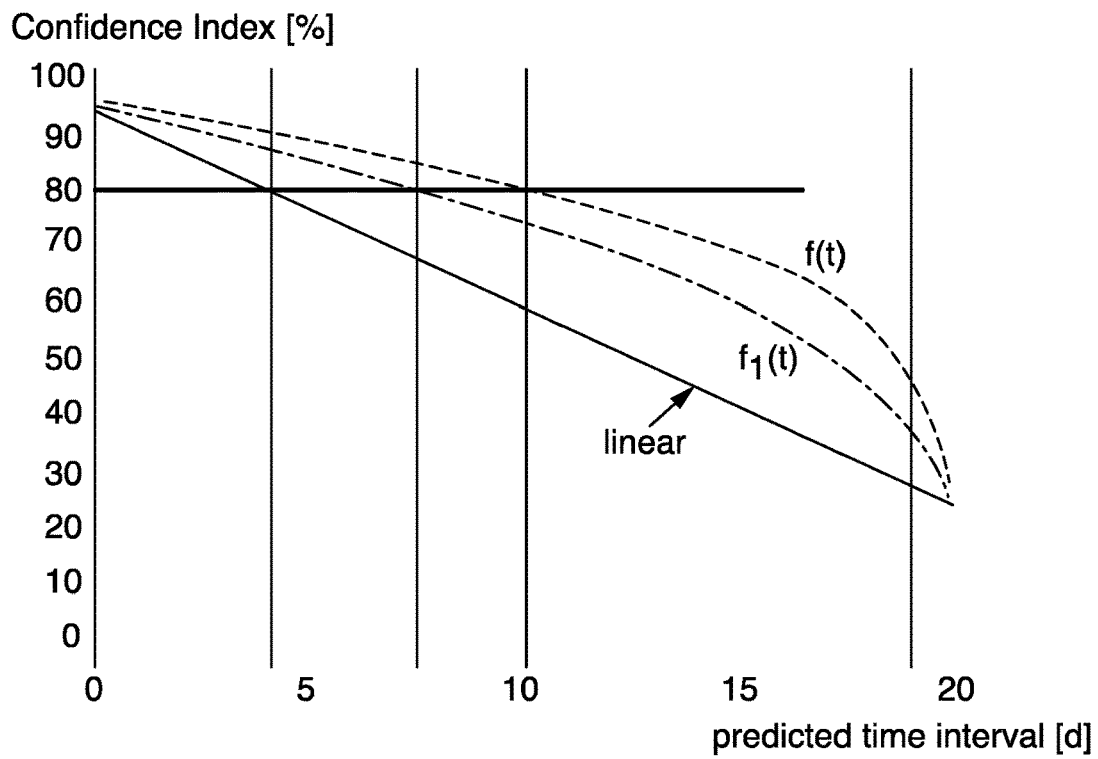
FIG. 6 shows a schematic view how the confidence level is determined.

As already mentioned, the inventive method provides, besides the predicted remaining time interval RTI until the next service action is due, a confidence level CL providing information regarding the reliability of the predicted remaining time interval RTI. The determination of the confidence level CL is visualized in FIG. 6 and FIG. 7.

One of the non-linear transformations $f(t)$, $f_1(t)$ is used to predict the confidence level CL of the remaining time interval RTI until the field device FD reaches the maximum tolerance T and therefore the limit of the measurement performance of the field device FD. The confidence level CF is preferably given as a percentage, wherein a percentage close to 0% indicates a low confidence level CF and a percentage close to 100% indicates a high confidence level CF. It is advantageous, if the confidence level CF is in the range of about 15% to 95%. The limits of the range can be arbitrarily set by the operator. In general, the lower range limit is related to the prediction method actually used in connection with the present disclosure, and the upper range limit is related to the measurement uncertainty of the confidence level CD.

Figure 7:
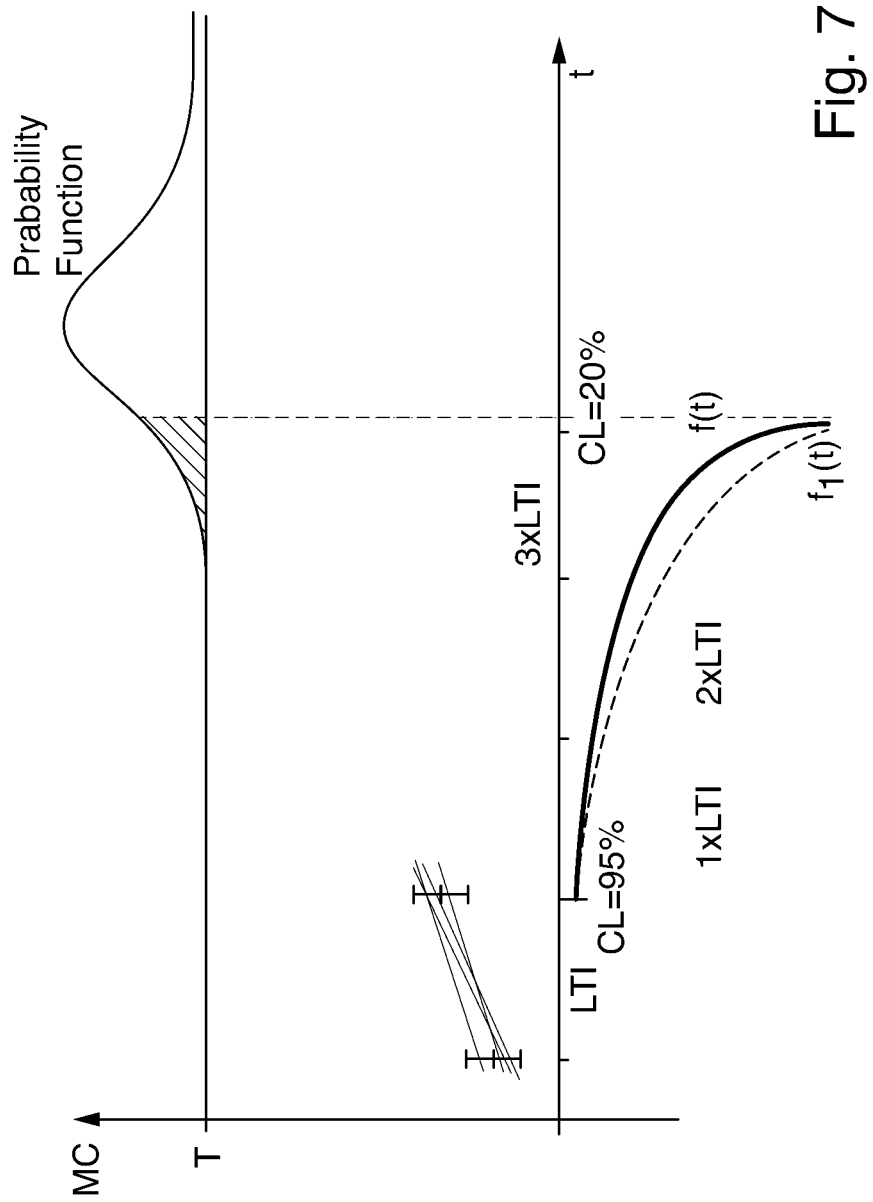
FIG. 7 shows a schematic view of the confidence level of a message is generated.

As shown in FIG. 7, the application of the nonlinear transformation on the remaining time interval RTI has the effect that the confidence level CL decreases nearly linear in the initial range of the remaining time interval RTI, while it decreases disproportionately fast in the end range of the predicted remaining time interval RTI. The prognosis is much more difficult and uncertain the further it goes into the future.

The invention claimed is:

1. A method of determining a remaining time interval until a measurement characteristic of a field device will have drifted outside of a maximum tolerance and a service action is required for the field device, wherein the field device is measuring or monitoring at least one process variable of a medium in a process-specific application of automation technology, the method comprising:
    determining the maximum tolerance, wherein the measurement characteristic of the field device is correlated to or related to a measurement performance of the field device, wherein the measurement performance of the field device in the process-specific application is unacceptable if the measurement characteristic of the field device drifts outside of the maximum tolerance;
    registering continuously the measurement characteristic of the field device;
    estimating a lag time interval, wherein the estimated lag time interval depends on a drift of the measurement characteristic of the field device in the process-specific application;
    using Artificial Intelligence to determine, at an end of the estimated lag time interval, the remaining time interval until the service action is required, wherein the remaining time interval until the service action is required is a time until the measurement characteristic of the field device will have drifted outside the maximum tolerance and wherein the determination of the remaining time interval until the service action is required is based on the continuously registered measurement characteristic of the field device; and
    generating a message informing of the remaining time interval until the service action is required.

2. The method of claim 1,
    wherein the estimating of the lag time interval is based on continuously registered data related to or correlated to the measurement characteristic of the field device during a past time interval.

3. The method of claim 1,
    wherein the estimating of the lag time interval is based on expertise.

4. The method of claim 1, further comprising:
    generating a status message indicating that the measurement performance of the field device is acceptable when the measurement characteristic of the field device, because of the drift, will not reach the maximum tolerance within a first subsequent time interval, wherein the first subsequent time interval is $k_1$ times the lag time interval, and wherein $k_1 \geq 1$.

5. The method of claim 4, further comprising:
generating a warning status message indicating that the measurement performance of the field device is decreasing when the measurement characteristic of the field device, because of the drift, will reach the maximum tolerance within a second subsequent time interval following the first subsequent time interval, wherein the second subsequent time interval is $k_2$ times the lag time interval, and wherein $0<k_2<k_1$.

6. The method of claim 5, further comprising:
generating a critical status message indicating that the measurement performance of the field device is close to the maximum tolerance when the measurement characteristic of the field device, because of the drift, will reach the maximum tolerance within a time less than $k_2$ times the lag time interval.

7. The method of claim 1, further comprising:
generating a message of failure if the measurement characteristic of the field device has reached or exceeded the maximum tolerance at the end of the lag time interval.

8. The method of claim 1, further comprising:
generating at least one status message; and
determining a confidence level of the at least one generated status message, wherein the confidence level provides information about a reliability of the determined remaining time interval until the service action is required.

9. The method of claim 8,
wherein the determining of the confidence level includes a non-linear transformation of the determined remaining time interval relative to the lag time interval.

10. The method of claim 8, further comprising:
providing the confidence level as a percentage, wherein a percentage close to 0% indicates a low confidence level and a percentage close to 100% indicates a high confidence level.

11. The method of claim 1, wherein the measurement characteristic of the field device is a measurement error of the field device.

12. The method of claim 1, wherein the determining of the remaining time interval until the service action is required includes using a Monte Carlo simulation.

13. A method of determining a remaining time interval until a measurement characteristic of a field device will have drifted outside of a maximum tolerance and a service action is required for the field device, wherein the field device is measuring or monitoring at least one process variable of a medium in a process-specific application of automation technology, the method comprising:
determining the maximum tolerance, wherein the measurement characteristic of the field device is correlated to or related to a measurement performance of the field device, wherein the measurement performance of the field device in the process-specific application is unacceptable if the measurement characteristic of the field device drifts outside of the maximum tolerance;
registering continuously the measurement characteristic of the field device;
estimating a lag time interval based on continuously registered data related to or correlated to the measurement characteristic of the field device during a past time interval, wherein the estimated lag time interval depends on a drift of the measurement characteristic of the field device in the process-specific application;
using Artificial Intelligence to determine, at an end of the estimated lag time interval, the remaining time interval until the service action is required, wherein the remaining time interval until the service action is required is a time until the measurement characteristic of the field device will have drifted outside the maximum tolerance and wherein the determination of the remaining time interval until the service action is required is based on the continuously registered measurement characteristic of the field device; and
generating a message informing of the remaining time interval until the service action is required.

14. The method of claim 13, wherein the determining of the remaining time interval until the service action is required includes using a Monte Carlo simulation.

* * * * *